United States Patent [19]

Allen

[11] Patent Number: 4,848,074
[45] Date of Patent: Jul. 18, 1989

[54] LEAF BUNDLING RAKE

[76] Inventor: Lewis E. Allen, P.O. Box 8026, Longview, Tex. 75607

[21] Appl. No.: 251,234

[22] Filed: Sep. 30, 1988

[51] Int. Cl.[4] ............................................. A01D 7/10
[52] U.S. Cl. .............................. 56/400.12; 56/400.17; 294/19.1; 294/50.7; 294/99.1
[58] Field of Search ............ 56/400.12, 400.11, 400.13, 56/400.16, 400.17, 400.21; 294/50.5, 50.6, 50.7, 50.8, 105, 107, 19.3, 99.1, 99.2

[56] References Cited

U.S. PATENT DOCUMENTS

| | | | |
|---|---|---|---|
| 2,250,313 | 7/1941 | Petz et al. | 294/50.5 |
| 2,746,234 | 5/1956 | Utey | 56/400.12 |
| 2,790,296 | 4/1957 | Bernstein | 294/50.6 X |
| 2,891,374 | 6/1959 | Richmond | 56/400.12 |
| 3,095,682 | 7/1963 | Pasquine | 56/400.12 |
| 3,105,348 | 10/1963 | Vosbikian et al. | 56/400.12 |
| 3,264,809 | 8/1966 | Jackson | 56/400.12 |
| 3,601,966 | 8/1971 | Kerry | 56/400.12 |
| 4,185,448 | 1/1980 | Blanco | 56/400.12 |
| 4,292,794 | 10/1981 | Gascon | 56/400.12 X |
| 4,545,189 | 10/1985 | Nelson | 56/400.12 |

*Primary Examiner*—Stephen J. Novosad
*Attorney, Agent, or Firm*—Norman B. Rainer

[57] ABSTRACT

A rake-like device is provided for grasping and lifting a pile of fallen leaves. The device is comprised of a hollow handle having a rake head attached to its lowermost extremity. The rake head is provided with a circular array of a multitude of flexible metal tines. A cable is disposed within the handle and extends in a loop configuration to engagement with eyes associated with the tines. When the cable is pulled upwardly, the tines move radially in unison in an inwardly convergent manner. When the pulling force is removed, the tines return to their outwardly disposed positions.

6 Claims, 4 Drawing Sheets

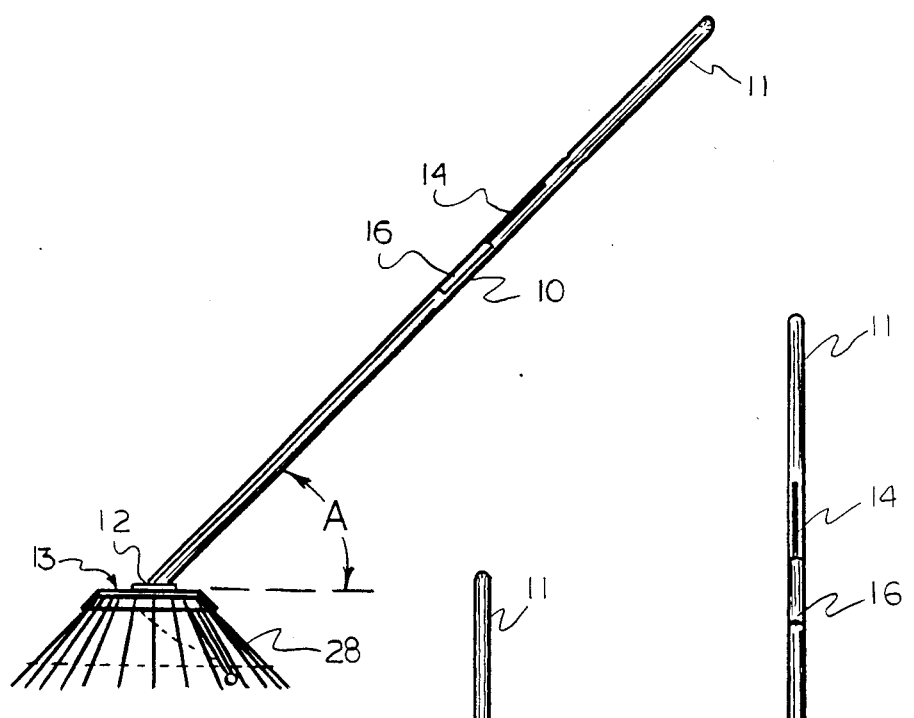
FIG. 1
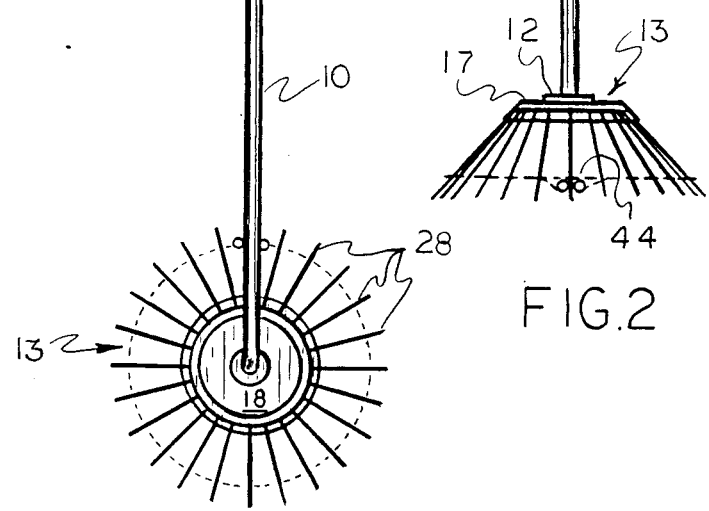
FIG. 2
FIG. 3

4,848,074

LEAF BUNDLING RAKE

BACKGROUND OF THE INVENTION

This invention relates to a rake-like device for grasping and lifting a pile of fallen leaves.

Fallen leaves are typically gathered into a pile by conventional rakes or blower devices. The pile is then picked up and placed within bags or other containers for disposal. The task of picking up the piles can be quite burdensome, particularly in view of the repeated bending and lifting movements. The elderly and handicapped may well find the task impossible.

Conventional leaf-gathering rakes generally have a rake head comprised of a multitude of flexible tines in a lateral array. Modified leaf-gathering rakes have been disclosed which incorporate features for grasping piles of leaves, thereby lessening or eliminating the need for the user to bend over. Such modified rakes generally employ a second rake head which pivotably interacts with the primary stationary rake head in a pincer-like movement. Examples of such rakes are disclosed in U.S. Pat. Nos. 4,545,189; 3,601,966; 3,105,348; and 2,891,374. The quantity of leaves which can be grasped by the pincer movement is limited. Also, the grasped leaves tend to fall out from the two side extremities of the rake heads and from the lowermost tips of the tines. The arcuate path taken by the pivoted second rake head also prevents thorough and uniform grasping of leaves reaching down to the underlying ground or lawn surface.

It is accordingly an object of the present invention to provide a hand-held rake-like device for efficiently grasping piles of leaves.

It is another object of this invention to provide a device as in the foregoing object which can grasp piles of leaves uniformly down to ground level.

It is a further object of the present invention to provide a device of the aforesaid nature of rugged, durable construction and amenable to low cost manufacture.

These objects and other objects and advantages of the invention will be apparent from the following description.

SUMMARY OF THE INVENTION

The above and other beneficial objects and advantages are accomplished in accordance with the present invention by a hand-held rake-like device comprising:

(1) an elongated straight rigid hollow handle having upper and lower extremities, (2) a rake head attached to said lower extremity and comprised of:

(a) a tine-holding plate having an upper surface of circular perimeter and having a multitude of equally spaced holding apertures in a circular array, and a downwardly angled skirt emergent from said perimeter and having a series of radially oriented grooves aligned with said holding apertures, (b) a multitude of identical elongated flexible metal tines having interior and exterior sides and upper and lower extremities, the upper extremities being bent to form a hook and the lower extremities being bent to form an angles portion coplanar with the hook and on the same interior side of the tine, and a rigid retaining eye associated with the exterior side of the tine above and adjacent said angled portion, said hooks engaging said holding apertures in a manner to seat said interior sides within said grooves, and (c) clamping means for maintaining said tines in said association with the tine-holding plate, (3) cable means having a lower extremity provided with loop means that engages said eyes, and an upper extremity which extends into said handle, and (4) control means slidably retained by said handle for pulling upward on said cable, whereby (5) when pulling force is applied to move the cable upwardly within said handle, the lower extremities of the tines are drawn radially inward in unison from their outermost disposition, and when said pulling force is released the cable moves downwardly within the handle and the tines return to their outermost disposition.

In preferred embodiments of the device, a manually operated sliding member is provided within the handle, and the upper extremity of the cable is carried by said sliding member, whereby upward movement of the sliding member raises the cable along the center axis of the handle. A deflecting wheel is preferably positioned beneath the tine-holding plate tangentially in line with the cable downwardly emergent from the handle. The cable travels about said guide wheel and thence travels within the interior of the rake head, as defined by the surrounding tines, to engagement with the retaining eyes.

In further preferred embodiments, an elongated hinge arm is provided having an upper extremity pivotably held adjacent the underside of the tine-holding plate, and a lower extremity provided with paired guide wheels disposed in a plane perpendicular to the plane of said deflecting wheel. The purpose of the hinge arm is to direct the cable, comprised at this site of two strands representing the converged portion of said loop, to lateral engagement with the retaining eyes.

The clamping means may be a plate-like structure of generally similar contour to, and seated upon, said tine-holding plate.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a left side view of an embodiment of the device of this invention.

FIG. 2 is a front view of the device of FIG. 1.

FIG. 3 is a top view of the device of FIG. 1.

For ease of description, the terms "interior", "exterior" and expressions of equivalent import will have reference to the geometric centers of the handle and rake head components of the device as shown in FIG. 1.

DESCRIPTION OF THE PREFERRED EMBODIMENT

Figure 4:
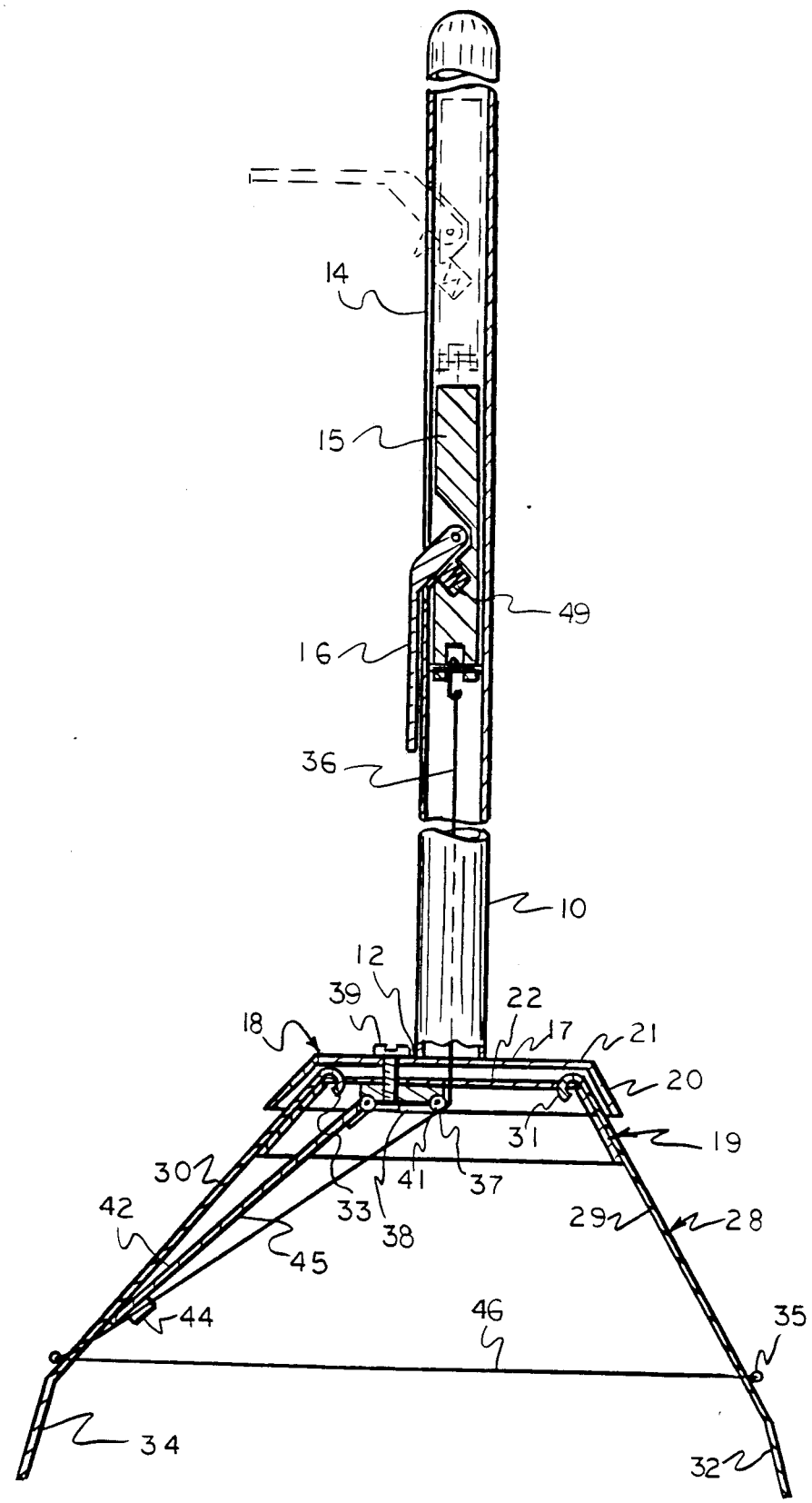
FIG. 4 is an enlarged vertical sectional view showing the device of FIG. 1 in its open state, and showing in phantom outline the closed state of the device.
Figure 5:
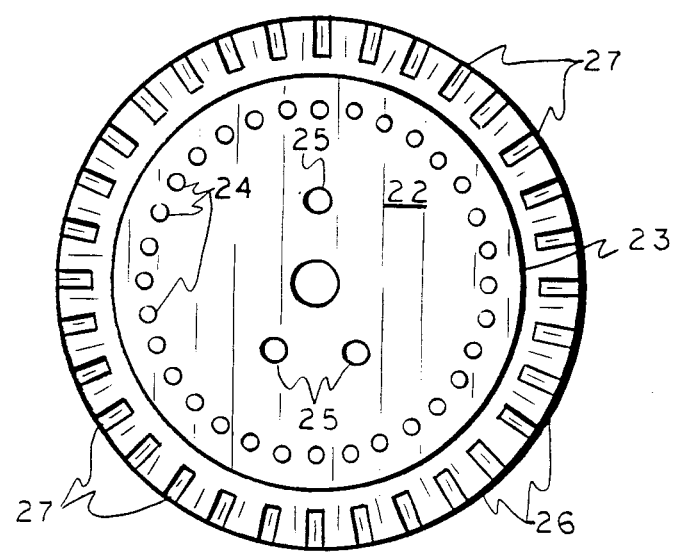
FIG. 5 is a top view of the tine-holding plate component of the device of FIG. 1.
Figure 6:
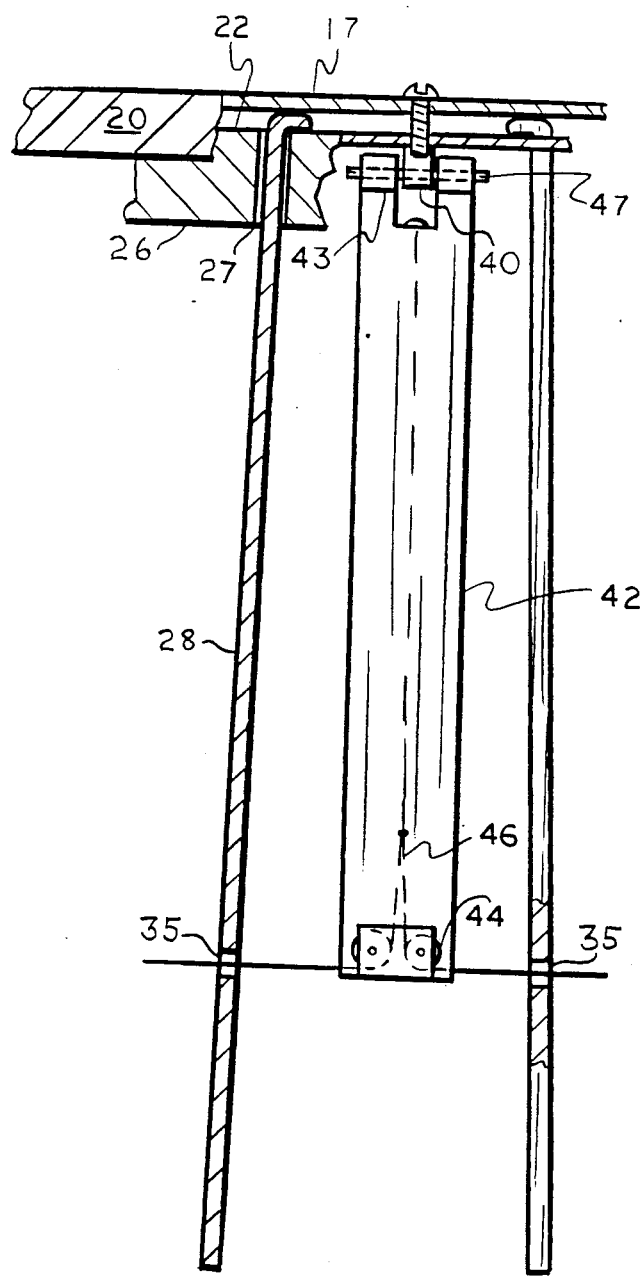
FIG. 6 is an enlarged fragmentary view taken from the left side of FIG. 4.

Referring now to FIGS. 1-6, an embodiment of the device of the present invention is shown comprised of elongated straight rigid hollow handle 10 of circular cylindrical configuration having upper and lower extremities 11 and 12, respectively, and rake head 13 attached to said lower extremity.

An elongated slot 14 is disposed in handle 10 adjacent upper extremity 11 and in parallel alignment with the longitudinal axis of the handle. An anchoring block 15 is slideably disposed within the handle. A manipulating lever 16 is pivotably attached to block 15 and adapted to extend through slot 14. By virtue of said lever, the block can be positioned between the two extremities of slot 14. A coil spring 49, recessed into block 15 restores lever 16 to a downward position flat against handle 10 when not in use.

Lower extremity 12 is interconnected by welding, bolting or equivalent means to the flat circular, center panel 17 of clamping plate 18. The nature of such interconnection is to dispose the handle at an acute angle A with respect to panel 17 when viewed inside elevation with the device forwardly directed. The value of angle A may range between about 35 and 55 degrees. It has been found that values of Angle A below 35 degrees or above 55 degrees cause difficulties in the overall operation of the device.

Clamping plate 18, which is the uppermost component of rake head 13, is further comprised of a downwardly angled skirt 20 emergent from the circular perimeter border 21 of panel 17 as a continuous integral extension thereof and shaped as a conical section.

A tine-holding plate 19 of generally circular configuration is disposed below clamping plate 18 in parallel, coaxial relationship therewith. Plate 19 is comprised of flat center panel 22 bounded by circular perimeter 23, said plate having a multitude of equally spaced holding apertures 24 disposed in a circular array, and mounting apertures 25 disposed within said circular array. A downwardly angled skirt 26 emerges from perimeter 23 as continuous integral extension of panel 22 and having the general contour of a conical section. Skirt 26 is provided with a series of radially oriented indentations or grooves 27, said grooves being radially aligned within holding apertures 24.

A multitude of identical elongated flexible metal tines 28 are equidistantly spaced bout plate 19. The illustrated tines are flat, having opposed interior and exterior sides 29 and 30, respectively, and upper and lower extremities 31 and 32, respectively. In other embodiments, however, the tines may be round rod stock. Upper extremities 31 are fashioned by bending to form hooks 33 inwardly directed from the interior side 29. Lower extremities 32 are bent to form angled portions 34 inwardly directed from interior side 29. A rigid retaining eye 35 of circular shape is welded to exterior side 30 of each tine above and adjacent angled portion 34. In alternative embodiments, the eyes may be incorporated into the tines by a bending operation having been achieved during the manufacture of the tines. Hook 33 of each tine engages a holding aperture 24 in a manner to seat interior side 29 within the corresponding groove 27 of skirt 26. Hooks 33 are held in place within said apertures 24 by abutting contact with the underside of panel 17 of clamping plate 18.

A cable 36 is connected at its uppermost extremity to anchoring block 15, and proceeds therefrom downwardly along the axis of the handle through apertures in panels 17 and 22 to tangential contact with deflecting wheel 37. Said deflecting wheel rotates about a horizontally disposed axle 41 held by mounting block 38. Threaded bolts 39 affix said mounting block to the underside of panel 22 and also draw clamping plate 18 and tine-holding plate 19 into close-fitting engagement. A first pivot channel 40 is disposed within block 38 in parallel relationship to axle 41.

An elongated flat hinge arm 42 having bifurcated second pivot channel 43 at its upper extremity is pivotably supported by hinge pin 47 interactive with channels 40 and 43. A pair of guide wheels 44 are rotatably mounted upon lower surface 45 of hinge arm 42 adjacent the bottom extremity thereof. Guide wheels 44 are adapted to rotate in a plane which is perpendicular to the plane of rotation of deflecting wheel 37.

The cable travels from the deflecting wheel to the region between guide wheels 44. At such point, the cable becomes bifurcated in terms of having a complete loop 46 that characterizes the lower extremity of the cable. The loop portion of the cable travels through the eyes 35 in a horizontal circular path. The paired guide wheels 44 on hinge arm 42 facilitate the passage of the cable into said eyes.

By virtue of the aforesaid construction, when anchoring block 15 is manually raised within handle 10 with the aid of lever 16, the cable is drawn upwardly, and the tines are caused to converge in unison in a radially inwardly directed manner. Such convergence of the tines grips leaves within the interior of the rake head. Upon release of said anchoring block, the tines spring back to their outward, unflexed state, thereby releasing the leaves.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A hand-held rake-like device comprising:
   (1) an elongated straight rigid hollow handle having upper and lower extremities,
   (2) a rake head attached to said lower extremity and comprised of:
      (a) a tine-holding plate having an upper surface of circular perimeter and having a multitude of equally spaced holding apertures in a circular array, and a downwardly angled skirt emergent from said perimeter and having a series of positioning means aligned with said holding apertures,
      (b) a circular array of a multitude of identical elongated flexible metal tines, each having interior and exterior sides and upper and lower extremities, said upper extremities being bent to form a hook and said lower extremities being bent to form an angled portion coplanar with the hook and on the same interior side of the tine, and a rigid retaining eye associated with the exterior side of the tine above and adjacent said angled portion, said hooks engaging said holding apertures in a manner to seat said interior sides within said positioning means, and (c) securing means for maintaining said tines in said association with the tine-holding plate, (3) cable means having a lower extremity provided with loop means that engages said eyes, and an upper extremity which extends into said handle, and (4) control means slidably retained by said handle for pulling upward on said cable, whereby (5) when pulling force is applied to move the cable upwardly within said handle, the lower extremities of the tines are drawn radially inward in unison from their outermost disposition, and when said pulling force is released the cable moves downwardly within the handle and the tines return to their outermost disposition.

2. The device of claim 1 wherein said positioning means are radially oriented grooves formed within said skirt.

3. The device of claim 1 wherein said securing means is a plate-like structure of generally similar contour to, and seated upon, said tine-holding plate.

4. The device of claim 1 wherein said control means is comprised of a sliding member which carries the upper extremity of said cable, whereby upward movement of the sliding member raises the cable along the center axis of the handle.

5. The device of claim 1 wherein a deflecting wheel is positioned beneath the tine-holding plate tangentially in line with the cable downwardly emergent from the handle, whereby the cable travels about said deflecting wheel and thence travels within the circular array of tines to engagement with said retaining eyes.

6. The device of claim 5 having an elongated arm having an upper extremity pivotably held adjacent the underside of the tine-holding plate, and a lower extremity provided with paired guide wheels disposed in a plane perpendicular to the plane of said deflecting wheel, said paired guide wheels serving to direct the cable to lateral engagement with the retaining eyes.

* * * * *